(12) United States Patent
McCaslin et al.

(10) Patent No.: US 8,545,069 B2
(45) Date of Patent: Oct. 1, 2013

(54) PORTABLE LIGHT ASSEMBLY

(75) Inventors: Christopher McCaslin, Alameda, CA (US); Doug Foss, Pacific Grove, CA (US); Roxanne Lo, Santa Cruz, CA (US); Robert Maxwell Davis, Santa Cruz, CA (US)

(73) Assignee: Light & Motion Industries, Monterey, CA (US)

( * ) Notice: Subject to any disclaimer, the term of this patent is extended or adjusted under 35 U.S.C. 154(b) by 0 days.

(21) Appl. No.: 12/930,966

(22) Filed: Jan. 19, 2011

(65) Prior Publication Data

US 2012/0182748 A1    Jul. 19, 2012

(51) Int. Cl.
*F21V 33/00*    (2006.01)
*F21V 21/084*    (2006.01)

(52) U.S. Cl.
USPC ............ 362/474; 362/473; 362/105; 362/106

(58) Field of Classification Search
USPC .................................. 362/106, 473, 474, 105
See application file for complete search history.

(56) References Cited

U.S. PATENT DOCUMENTS

| | | | | |
|---|---|---|---|---|
| 5,717,460 A | * | 2/1998 | Tsuruta et al. | 348/371 |
| 5,833,534 A | * | 11/1998 | Lai | 362/473 |
| 6,286,982 B1 | * | 9/2001 | Tashiro | 362/474 |
| 6,953,260 B1 | * | 10/2005 | Allen | 362/194 |
| 7,178,933 B1 | * | 2/2007 | Chuang | 362/106 |
| 7,347,596 B2 | * | 3/2008 | Ishikawa | 362/473 |
| 2008/0253109 A1 | * | 10/2008 | Canino et al. | 362/105 |
| 2009/0207591 A1 | * | 8/2009 | Kumthampinij et al. | 362/105 |
| 2009/0323317 A1 | * | 12/2009 | Spartano et al. | 362/105 |
| 2010/0002421 A1 | * | 1/2010 | Arnold, III | 362/183 |

* cited by examiner

*Primary Examiner* — David J Makiya
*Assistant Examiner* — Bryon T Gyllstrom
(74) *Attorney, Agent, or Firm* — Thomas M. Freiburger

(57) ABSTRACT

A portable light apparatus includes a light housing with a light source and a separate battery case connected to the light housing with a cable. The light apparatus can be configured and used in several different ways: as a miner light or flashlight, with the light housing secured to an end of the battery case via a snap-in connection; as a bicycle light, with the battery case secured to a handlebar stem and the light housing secured to the handlebar or stem; a helmet light, with the battery case attached at the back of the helmet and the light housing at front; and as a headstrap light, with the light housing attached to the headstrap at a front position and the battery casing at a different position, preferably at rear. Clips, brackets and straps are included for adapting the light and battery case to the various purposes, without tools. Preferably the light housing is capable of pivoting on a base, so the user can adjust aim of the light beam.

20 Claims, 9 Drawing Sheets

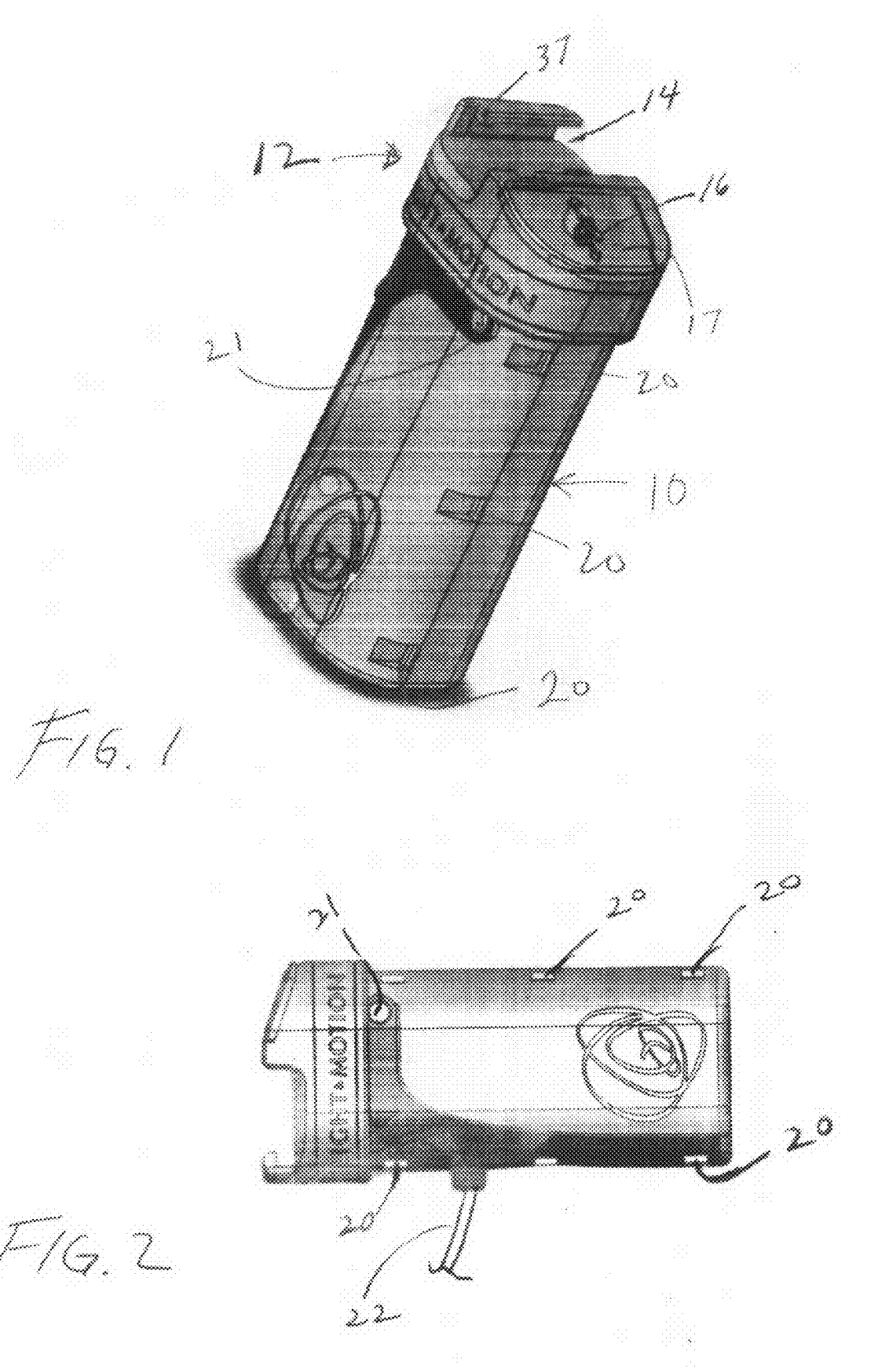

PORTABLE LIGHT ASSEMBLY

BACKGROUND OF THE INVENTION

This invention concerns portable battery-powered lighting, and particularly a multipurpose portable light device especially for sports activities, driven by a rechargeable battery, light in weight and producing a bright light beam for an appreciable period of time.

Battery-powered headlamps projecting a relatively high-power beam suitable for various activities have been available in several different forms. Some examples are Black Diamond Sprinter, Surefire Saint, PT Apex, Mamet Lucido and Petzl Myo XP. The above headlamps are all attached to headstraps. Some are driven by rechargeable batteries and some by disposable batteries. These headlamps are intended primarily for running and other sports such as cave exploration and mountain climbing. Typically the battery pack is secured at the rear of the headstrap.

Lupine Lighting Systems markets several portable lamps in different degrees of brightness, including Pico, Betty and Wilma series, some of which have accessories for attachment to a bicycle helmet and consist of a lamp element connected by cable to a battery case. Some of the models can include accessories for use of a particular lamp on either a bicycle or a headstrap. One model includes a headstrap with a front element imitating a bicycle bar in size and shape so that the lamp housing can be interchanged between a bicycle bar and the headstrap. A helmet mount is similarly configured, imitating the size of a bicycle bar. Several of the light housings have pivot connections enabling aiming of the light beam.

Another multipurpose bicycle light recently introduced by an Australian firm as Ay Up V4, Adventure Lighting, has provision for mounting a dual-headlamp light and battery on a bicycle helmet, on a bicycle handlebar or on a headband. Velcro pads are used to secure the headlamps and battery pack to the helmet when to be used in this way, and various accessories are included to secure the equipment to bike handlebars and to a headstrap. An adapter bracket for the handlebar is secured to the bar with zip ties. The lighting system is described at Ayup-lights.com.

SUMMARY OF THE INVENTION

The portable, versatile lighting devices of the current invention are useable on headbands, bicycle helmets, bicycle handlebars or stems, or as a unitary miner light or flashlight with the lamp housing and battery case secured together. The lamp apparatus of the invention is light in weight, about 125 grams including the battery case. In a preferred embodiment it is capable of a 150 lumen beam for about 3 hours at full lumen strength, the power supply being regulated to maintain full beam power for the duration of the approximately 3 hours.

An important feature of the device is a micro USB charging port for recharging the battery, which may be a lithium-ion battery. The port preferably is located on the battery case.

The light apparatus essentially comprises a set of parts, the principal components being a light housing with lamp and reflector, and a separate battery case, the two being connected by a flexible power cable. The light assembly includes a mounting adapter configured to join together with a receiving adapter on an end of the battery case in releasably locking relationship, enabling use of the light apparatus as a single light projecting unit or flashlight.

Accessories facilitate attachment of the light apparatus to a bicycle, a helmet or a headstrap. A bicycle mounting device secures to the battery case by snapping onto the exterior of the case, enabling the battery case to be secured to a bicycle or to a helmet, preferably via an elastic strap. A bicycle light mount secures to the light assembly and is adapted to secure the light housing to a bicycle handlebar or stem or a helmet. A headstrap mounting device is adapted to secure the battery case to a headstrap to be worn by a user, and a headstrap light mount is adapted to secure the headlamp assembly to a headstrap to be worn by a user.

The light apparatus of the invention can be configured as a single unit to serve as a flashlight; can be mounted on a helmet with the light housing at front and a battery case at rear, can be secured to a headstrap with the light housing at front and the battery case at a different position on the headstrap; or can be attached to a bicycle handlebar or handlebar stem. No fasteners or tools are required to change between modes of use.

In a preferred embodiment the mounting adapter of the light assembly comprises a base connected by a pivot joint to the light housing, so as to enable the light housing to be adjusted for aim of the light beam. The mounting adapter, which is configured to join together the receiving adapter of the battery case, slides in a slot that closely receives the lighting assembly base. The slot or adapter includes or is adjacent to a releasable locking device that retains the lighting assembly together with the battery case until they are to be used separately.

For mounting the light apparatus on a bicycle, the bicycle mounting device described above has a strap securable to the battery case and configured to extend around a bicycle bar or handlebar stem, or, for use on a bicycle helmet, through openings in the helmet. For this purpose the apparatus can include a clip-on bracket that has slots or other means for receiving both ends of the strap. The battery case has specific indentations to engage firmly with the clip-on bracket.

For use on a headband or headstrap, a headstrap mounting device for the battery case comprises a snap-on clip specifically configured to firmly engage the exterior of the battery case, with the clip having a slot for receiving a headstrap to retain the battery case on the headstrap. Similarly, the headstrap light mount includes a headstrap clip securable to the light assembly. This headstrap clip has a pair of slots through which the headstrap can be threaded to secure the light assembly to the headstrap.

The micro USB charging port of the light apparatus provides for use of a cell phone charger, which can include a solar charger, for recharging the battery. Charging can also be via a computer, or with a plug-in adapter.

The light apparatus includes a battery status indicator, preferably located on the battery case but optionally on the lamp assembly. This is an important feature in that the light system has a power regulator that dynamically maintains the lamp at full selected brightness until the battery is depleted, rather than simply allowing the lamp to dim as the battery is drawn down, which is the case with some headlamps and bicycle lights.

Another feature in one preferred embodiment is dual lamps in the light assembly, e.g. white and red LED emitters, selectable according to conditions. Red light (or green) may be desirable, for example, at night on a boat for map reading, with the light apparatus worn on a headstrap.

The light apparatus of the invention is efficient in size, weight, brightness and duration. Competing bicycle lights or headlamps in a comparable range of brightness typically are far heavier in weight, some using non-rechargeable batteries.

A principal object of the invention is to provide a versatile rechargeable battery-powered portable light apparatus which produces a constant bright beam for a lengthy period of time, is completely rechargeable with a micro USB charging port, which is light in weight and can be configured, without tools, for bicycling, headstrap use or as a unitary handheld or pocket mounted light, with adjustable beam aim. These and other objects, advantages and features of the invention will be apparent from the following description of a preferred embodiment, considered along with the accompanying drawings.

DESCRIPTION OF THE DRAWINGS

FIG. 1 is a perspective view showing a battery case of a portable light assembly of the invention.

FIG. 2 is a side view of the battery case.

DESCRIPTION OF PREFERRED EMBODIMENTS

Figure 4:
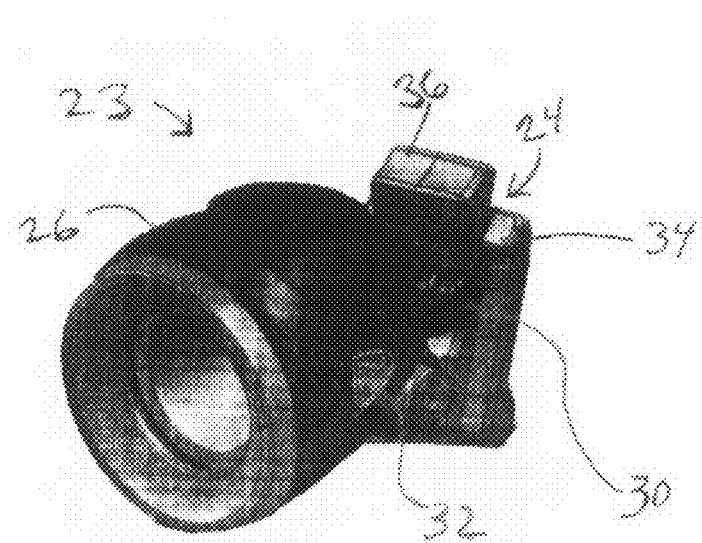
FIG. 4 is a perspective view showing the headlamp device.
Figure 3:
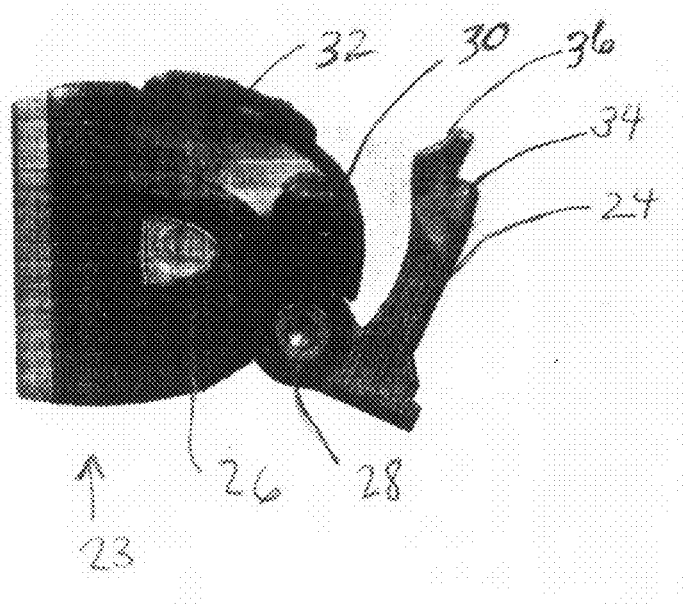
FIG. 3 is a side view of a headlamp with housing and mounting base, configured to be jointed together with the battery case shown in FIGS. 1 and 2.

FIG. 1 shows a battery case 10 forming an important part of the invention. The battery case, preferably containing a lithium-ion battery, is formed of a rigid, durable plastic and has one end 12 with a slot or channel 14 configured to receive a headlamp (described below) of the invention in snapped-together relationship. FIG. 1 shows a symbol 16 on the end of the case, indicating a micro USB charging port beneath a flip-up cover 17. FIG. 2 shows the battery case in side view, revealing the same side as in FIG. 1. These drawings show indents 20 that are formed on the exterior of the case 10, to receive any of several clips for specific purposes, to be described below. FIG. 2 also shows a power cable 22, preferably a partially coiled approximately 3 mm diameter black cable, that extends from the battery case, secured into the headlamp, which is shown in FIGS. 3 and 4 but without the cable. FIGS. 1 and 2 also show a battery status indicator light at 21, which can be a multi-color LED whose color indicates charge level.

FIGS. 3 and 4 show the headlamp assembly 23. As best seen in FIG. 3, a base 24 of the lamp assembly serves as a mounting adapter that slidingly fits into the slot 14 of the battery case just described. The mounting adapter/base is secured to a main lamp housing 26 with a pivot connection 28 which will normally be on a horizontal axis. This pivot connection is a tight or high-friction connection allowing the headlamp to be swivelled on the base 24 for aim of the headlight beam, but firmly holding the headlamp housing in the selected position. As seen in FIGS. 3 and 4, the housing has a cable receiving grommet 30 at one side, although the cable itself is not shown in FIGS. 3 and 4. Also shown in the housing are side lights 32, one on each side, and these may be amber in color for clearly revealing the presence of a bicycle rider, jogger, etc., from the side. The headlamp itself preferably comprises one or more bright LED emitters, which project a forward beam as well as directing some light toward the side marker lights 32. Within the housing is a power supply that regulates power dynamically to the LED or LEDs as discussed above, to maintain constant brightness. Such LED driver circuitry is well known, at least in other contexts, and is not shown in the drawings.

The base or mounting adapter 24 includes barb-like latch elements 34 on each side of a thumb button 36 which serves to release the base from the battery case when desired. The latch elements 34 on attachment slide under and then engage against abutments or position stops 37 on each side. The base 24 is shaped to cooperate with the slot or track 14 to snap the barbs 34 into place on assembly, and to allow deformation of the base or its position in the slot when the thumb button 36 is depressed, sufficient to release the barbs. The track 14 can include a (preferably plastic) spring beam for this purpose. FIGS. 1 and 2 show the back side of the receiving slot or channel of the battery case, and the latching arrangement is understood better with reference to FIGS. 5 and 6.

Figure 5:
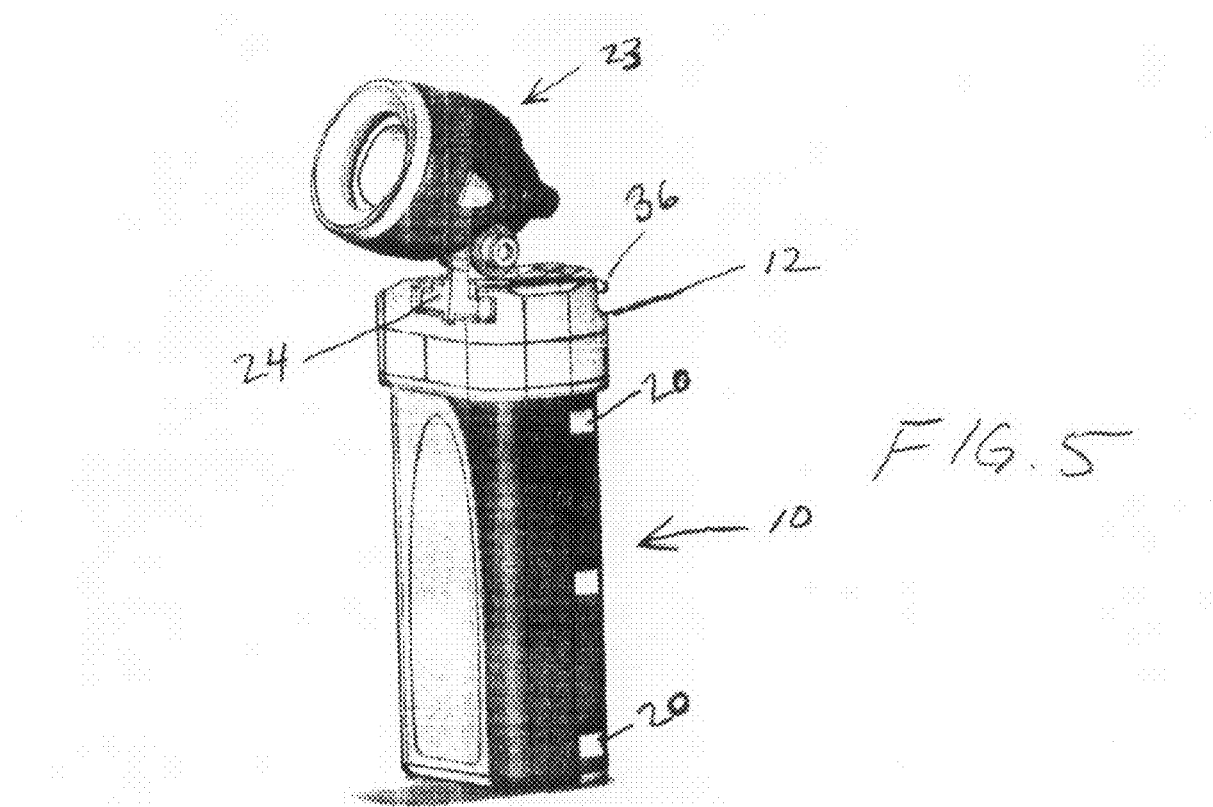
FIGS. 5 and 6 are perspective views showing the headlamp and battery case joined together as a miner's light or flashlight.
Figure 6:
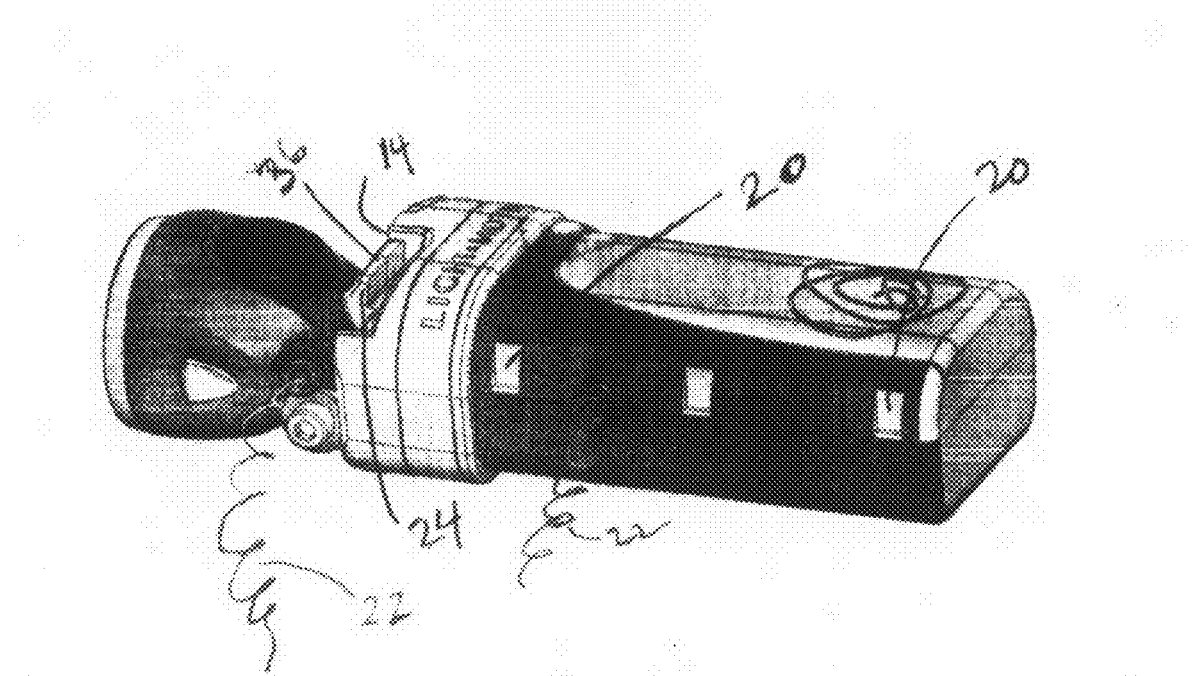

FIGS. 5 and 6 show the lamp housing and battery casing assembled together in a unitary arrangement for use as a miner's light or flashlight, with a swivel-adjustable beam. The lamp assembly 23 is secured, by its base 24, to the upper end 12 of the battery case, in the slot 14 which is best seen in FIGS. 1 and 2. FIG. 5 shows the side of the battery casing where the lamp head base 24 comes to rest in the slot 14. The base snaps into the position shown in FIGS. 5 and 6, and can be released using the thumb release 36 when desired. The power cable 22 is indicated schematically in FIG. 6, not shown in FIG. 5. In another embodiment not illustrated, the cable can be a plug-in cable at both ends, and contacts can be present on the bottom of the base 24 and on the slot floor (or at sides of the base and slot) for power connection.

Figure 7:
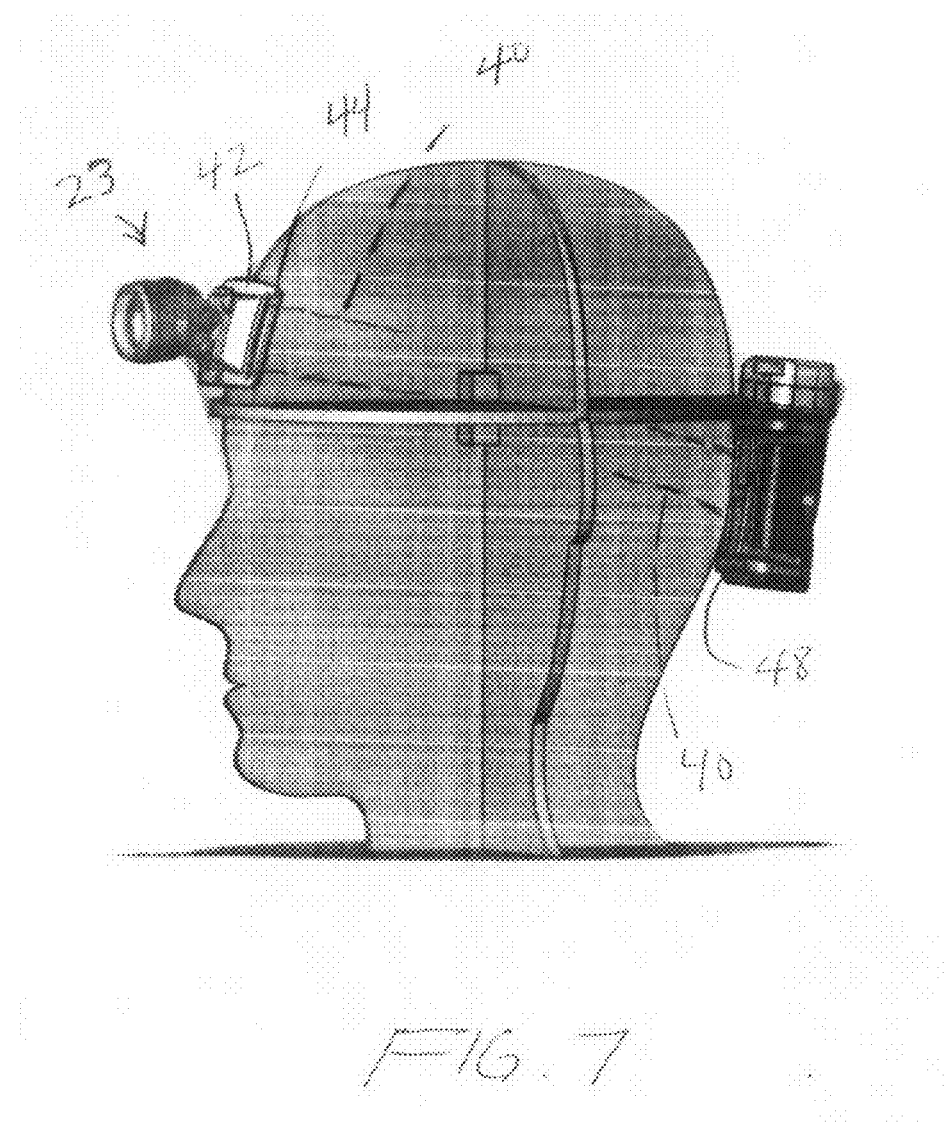
FIG. 7 is a perspective view showing the headlamp and battery case as worn on a headstrap over the head of a user, with accessories for connecting to a headstrap.
Figure 8:
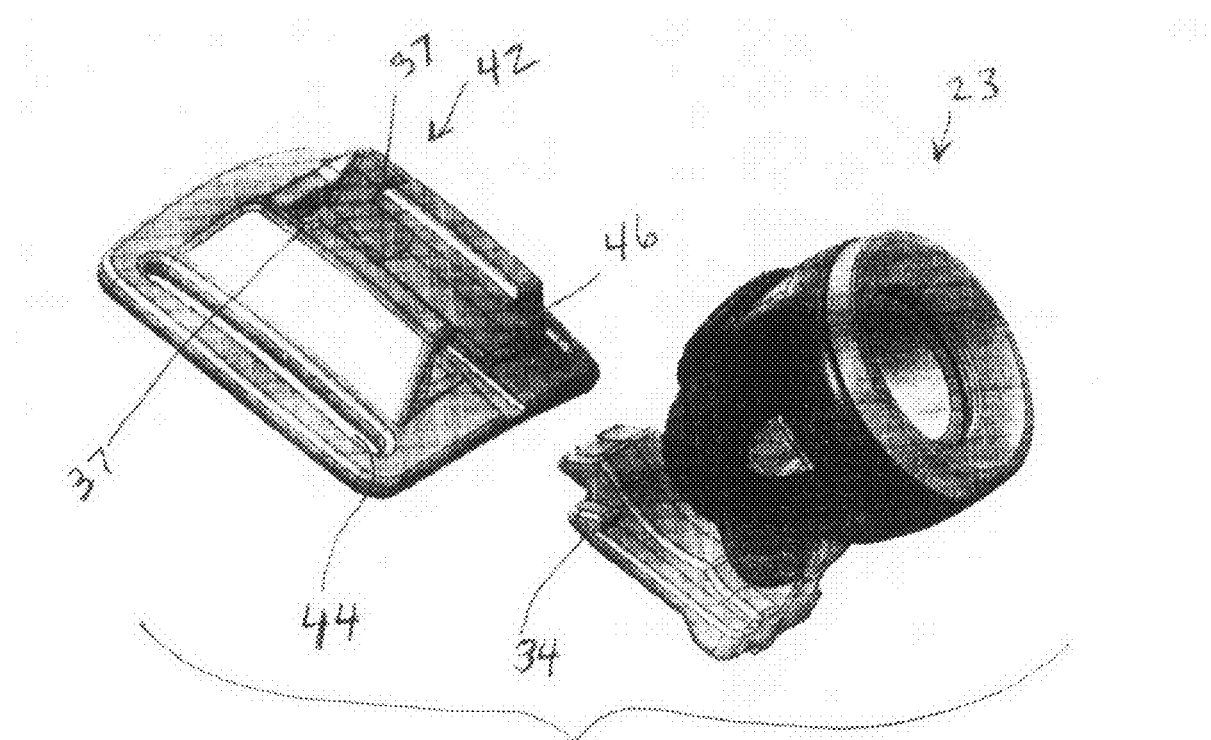
FIGS. 8 and 9 are views showing accessory clips or brackets for securing the headlamp and the battery case to the headstrap, respectively.

FIG. 7 shows schematically the light assembly of the invention secured on the head of a person. This is via a headstrap 40. The headlamp assembly 23, with its base 24, assembles together with a headstrap light mount 42 comprising a bracket that has a pair of slots 44 through which the headstrap 40 is threaded. As shown in FIG. 8, the headlamp bracket or mounting device 42 has an adapter 46 which includes a slot identical to the slot 14 in the battery case, thus allowing the headlamp assembly 23 to slide and snap into place in the bracket 42 in the same way as described above regarding the battery case. The position stops or abutments 37 that engage the barbs 34 are seen in FIG. 8.

Figure 9:
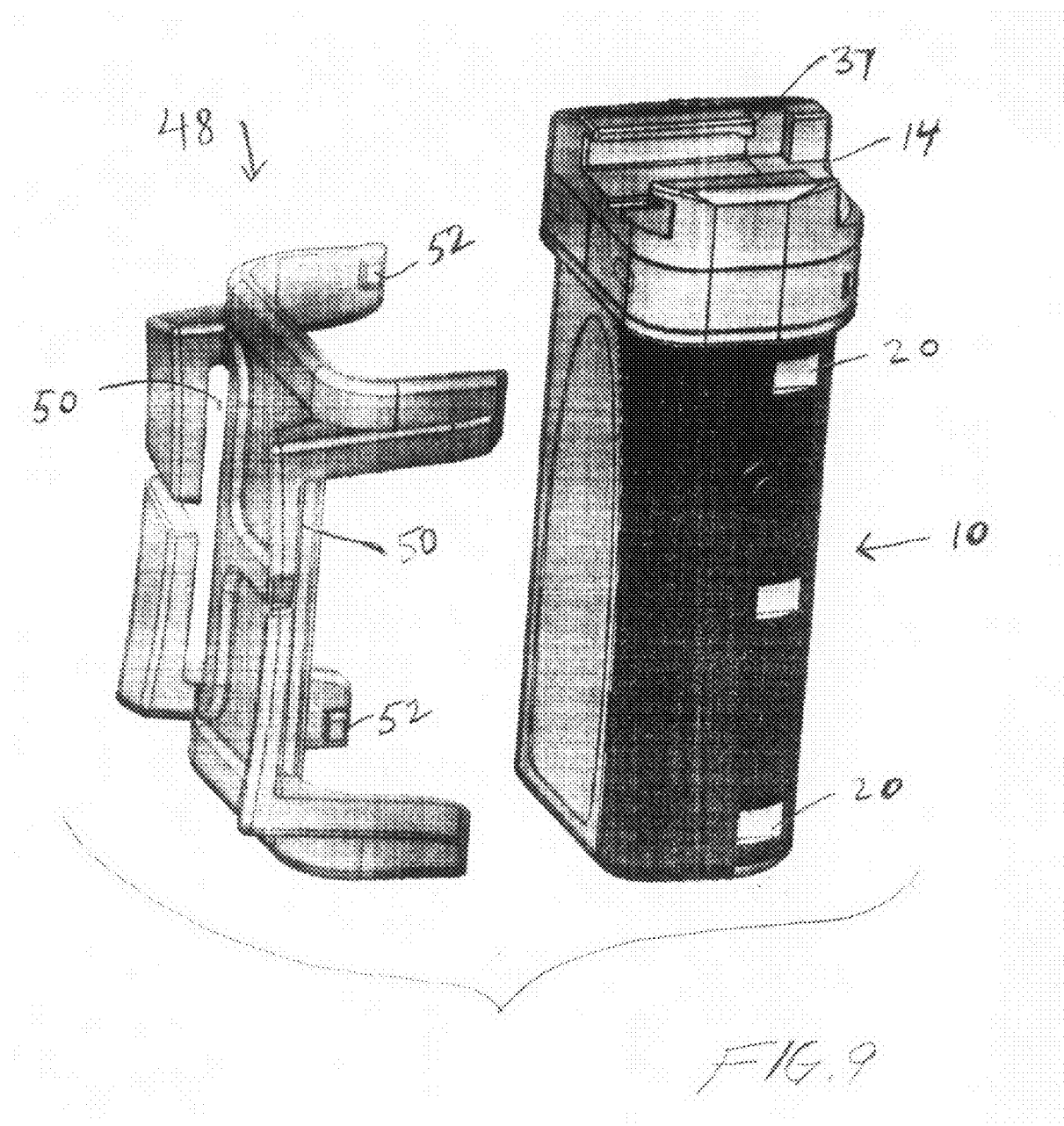

At another location on the headstrap 40 in FIG. 7, preferably at the back of the head as shown, the battery case 10 is clipped together with a headstrap mounting device or battery case clip 48, which, as shown in FIG. 9, has a pass-through slot 50 for receiving the headstrap. The clip 48 is secured to the battery case by pushing it over the battery case, which would be from the left as seen in FIGS. 7 and 9, until hooks or protrusions 52 snap firmly into position in the indents 20 that are seen in FIGS. 1, 2, 5, 6 and 9. A firm and stable connection is made between the clip and the battery case.

Figure 10:
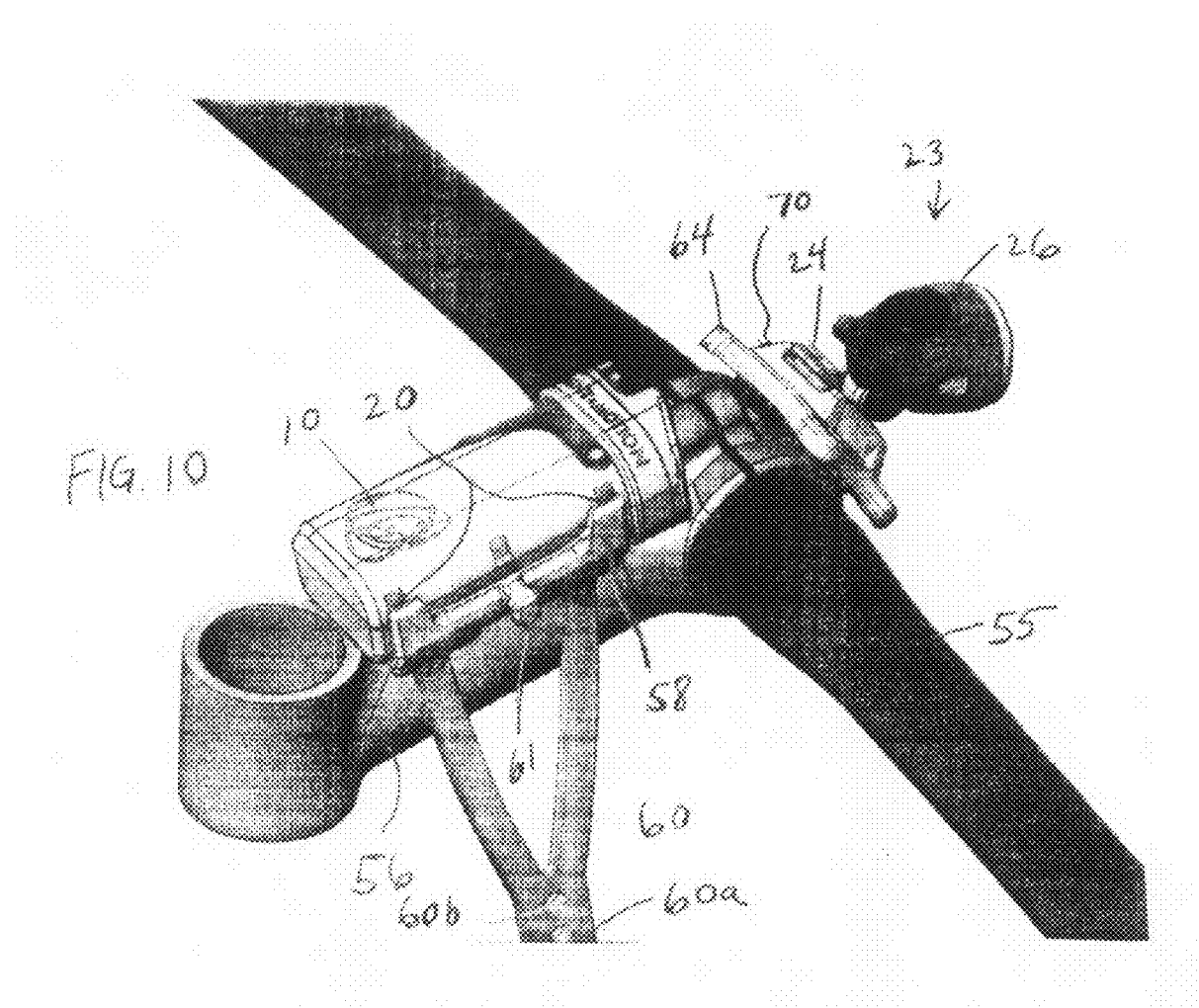
FIGS. 10 and 11 are perspective views showing the headlamp device and battery case secured to a handlebar stem of a bicycle and (FIG. 11) the two components apart from the bicycle, and showing accessory mounting devices.
Figure 11:
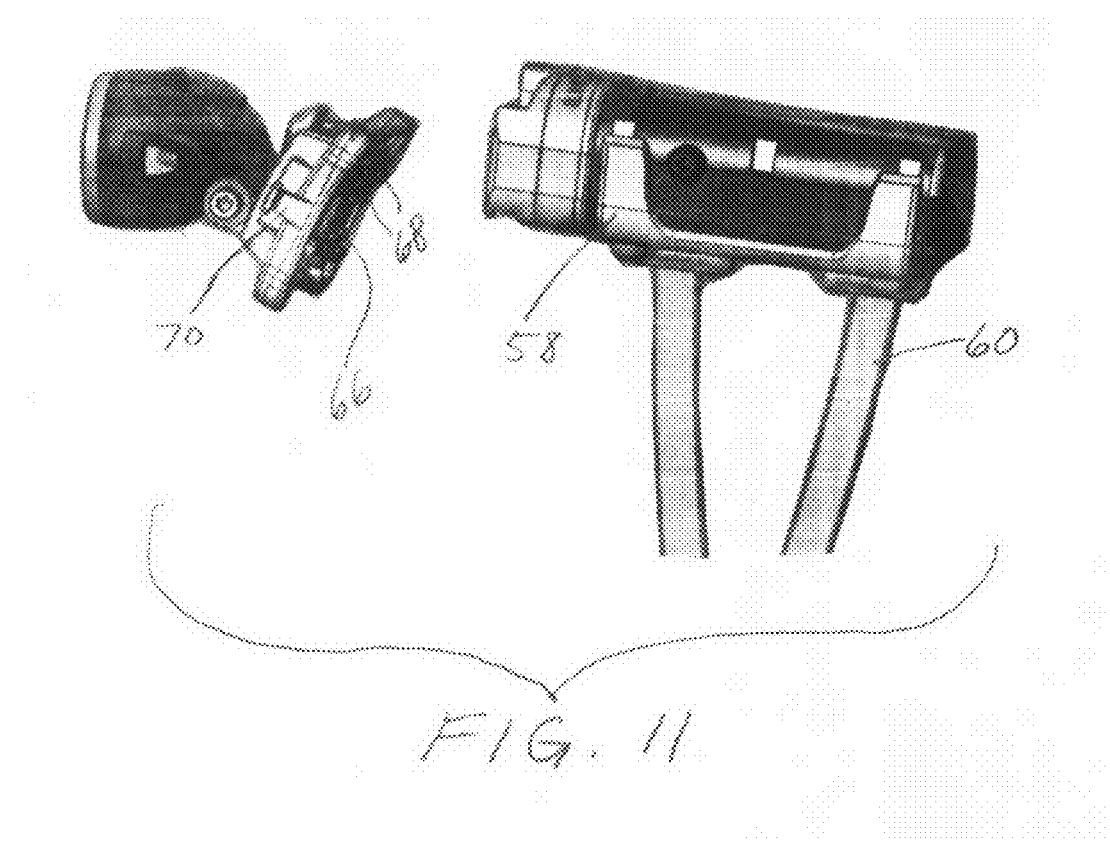

FIGS. 10 and 11 show another use of the portable light apparatus of the invention. Here, a bicycle handlebar 55 and handlebar stem 56 are shown, with the light assembly 23 and battery case 10 secured on the stem. For this application a different battery case clip or bicycle mounting device 58 is provided, engageable in snap-on relationship with the exterior of the battery case, via the indents 20, in the same way as shown in FIG. 7 for the headstrap adaptation clip. The bicycle battery case clip 58, as shown particularly in FIG. 11, has an elastic strap device 60 preferably permanently secured at one side. The strap, which may be Y-shaped, is adapted to wrap down around the bar component 56 of the handlebar stem as indicated, then to engage via its tail end 60a (partially shown) with a post or hook 61 on the case clip 58, via one of a series of holes 60b.

The headlamp assembly 23 has a special bicycle light mount or bracket 64, shown at the front end of the bicycle stem 56, this bracket having a slide-in slot that mimics the slot 14 at the one end of the battery case, and/or the slot 46 in the headstrap mount of FIG. 8. Again, the base 24 of the headlamp assembly slides and snaps into the slot of a bracket 64, locking into place until deliberately released. This bracket or headlamp light mount 64 has a rubbery or elastomeric cushion 66 at its bottom side (shown to the right in FIG. 11), and this rubbery piece may have nipples 68, all for the purpose of engaging stably and securely against the handlebar 55 or the against the front end of the handlebar stem 56 as shown in FIG. 10. For securing the bracket 64, common plastic zip ties preferably are used, not shown in the drawings. These make a tight and secure connection, at both left and right sides of the bracket 64, and this can be via posts or holes 70 on the bracket. In FIGS. 10 and 11 the power cord is not shown, but it extends from the battery case to the headlamp housing.

Figures 12, 13:
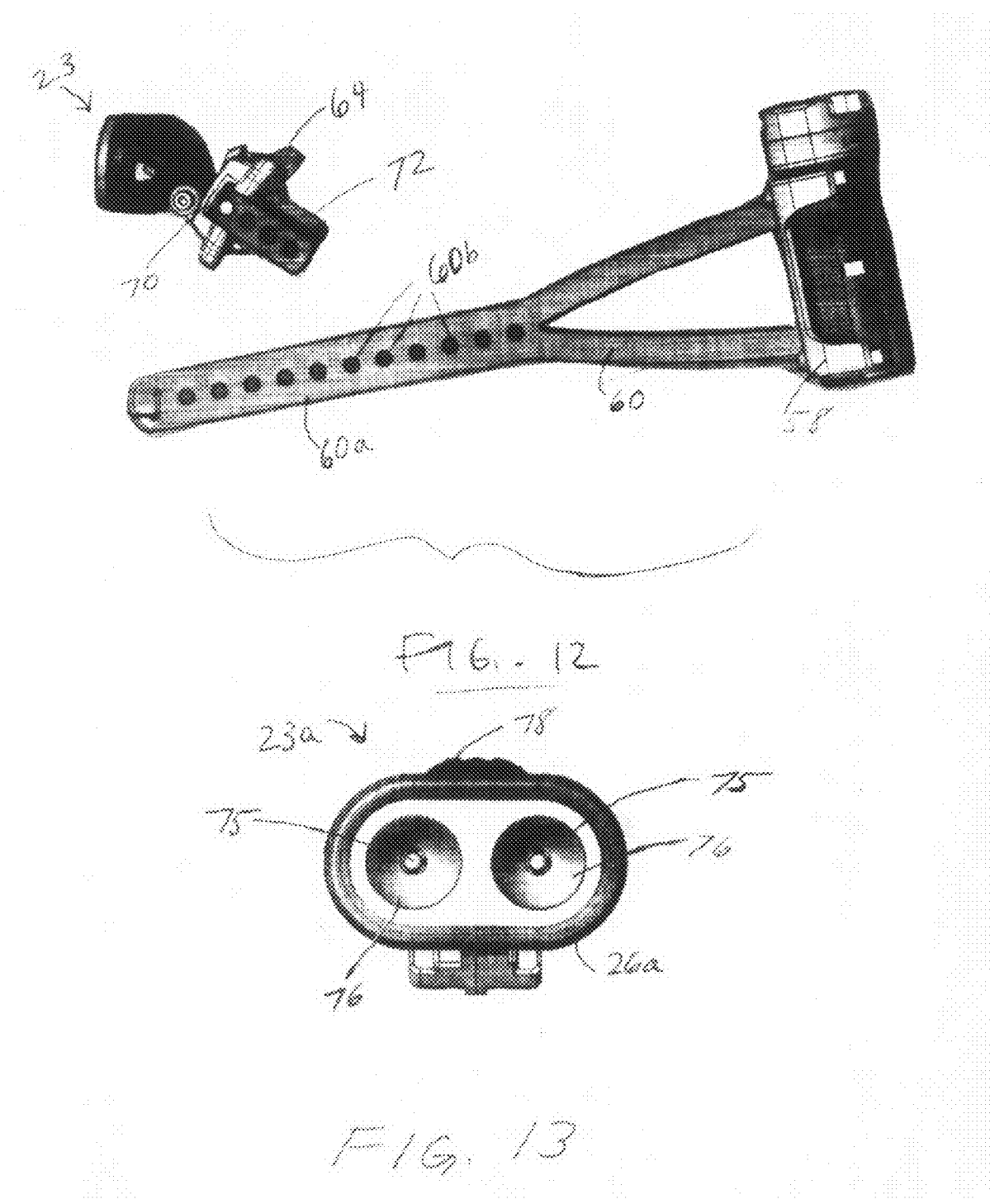
FIG. 12 is a perspective exploded view showing the headlamp and battery case as secured to snap-on accessories that enable attachment of the lamp and battery case to a helmet.
FIG. 13 is a frontal view showing a modified headlamp device.

FIG. 12 shows the headlamp assembly 23 and the battery case 10 in an arrangement for helmet mounting, such as on a bicycle helmet. The same bike mount or bracket 64 is used, receiving the light assembly in snap-in locking relationship. Instead of zip ties (which are preferred on handlebars or other bicycle bars), the helmet mounting preferably utilizes a stretchable rubber strap 72 as shown. The strap 72 is attached to the hooks 70 on the bracket 64 and stretched through openings at the front of the helmet. Normally a helmet has vent holes symmetrically positioned at or near the front of the helmet, and the rubbery elastomeric strap 72 stretches around the structure between these vent holes.

On the battery case the same snap-on clip (bicycle mounting device) 58 as in FIG. 11 is employed. This firmly secures to the battery case as noted above, and the rubber or elastomeric strap 60 as in FIG. 11, preferably a Y-shaped strap as shown, is wrapped through vent openings at the back of the helmet and the tail end 60a is then secured back to the other side of the clip or mounting device 58, to a hook or post as in FIG. 10.

FIG. 13 shows a modified headlamp assembly 23a. This headlamp includes two LED emitters 75 and reflectors 76, in a widened housing 26a. The two LEDs 75 can be used alternatively, via a switch 78 on top of the unit, to project different types of light for different situations. This can be useful particularly when the light is mounted on a headband, so that the user can project red light (or green light) as an alternative to white light, under conditions where white light would affect the user's night vision. This could be the case on a sailboat or a yacht, for example, where one's night vision is needed but maps or charts must also be consulted. Previously some headlamps have included a flip-down red lens for this purpose, but such a lens will absorb approximately 25% of the light, and thus flip-down lenses are not efficient.

The invention enables versatile use of a lightweight battery powered lighting apparatus for convenient and readily-exchanged multiple purposes. Accessory attachment devices are compact and very easily used, without fasteners or tools, with the headlamp having a universal slider device that enables clipping to a headstrap, helmet mount or bicycle mount. In addition, via the same universal slider device the headlight clips onto the end of the battery case to make a flashlight or miner's light. For all uses the headlamp is adjustable as to beam aim. The system has a micro USB charging port, enabling charging from a cell phone charger or a computer, and a battery status light indicator.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

We claim:

1. A portable electric light apparatus defining a kit of parts with multiple uses, comprising:
   a light assembly with a lamp element and a reflector, and a light housing carrying the lamp element and reflector,
   a battery case containing a battery, and an external power cable adapted to connect the battery case and battery to the light assembly,
   the battery case having at one end a receiving adapter for the light assembly, the receiving adapter comprising a slot, and the light assembly including a base configured to slide closely into the slot and lock therein, so as to join together with the battery case in releasably locking relationship to support the light assembly on said one end of the battery case, enabling use of the light apparatus as a single light projecting unit,
   a bicycle mounting device securable to the battery case, including a clip with a configuration to be snapped onto and retained on the battery case without use of tools, enabling the battery case to be secured to a bicycle or to a helmet,
   a headstrap mounting device securable to the battery case, with a clip of the same said configuration to be snapped onto and retained on the battery case, enabling the battery case to be secured to a headstrap to be worn by a user,
   a bicycle light mount securable to the light assembly via a slot on the bicycle light mount similar to the slot on the receiving adapter of the battery case, receiving the base of the light assembly sliding closely therein, and the bicycle light mount being adapted to be secured to a bicycle or a helmet, and
   a headstrap light mount securable to the light assembly via a slot on the headstrap light mount similar to the slot on the receiving adapter of the battery case, receiving the base of the light assembly sliding closely therein, the headstrap light mount being adapted to be secured to a headstrap to be worn by a user,
   whereby the light apparatus can be configured as a single unit to serve as a flashlight; can be mounted on a helmet with the light housing at front and the battery case at rear, connected together with the power cable; can be secured to a headstrap with the light housing at front and the battery case at a different position on the headstrap, connected together with the power cable; or can be attached to a bicycle handlebar or handlebar stem, all without the use of tools.

2. The apparatus of claim 1, wherein the light assembly includes a pivot joint connecting the base to the light housing, enabling the light housing to be adjusted as to aim.

3. The apparatus of claim 1, wherein the bicycle mounting device includes a strap configured to extend around a bicycle bar or stem, or through openings in a helmet.

4. The apparatus of claim 1, wherein the headstrap mounting device for the battery case includes a slot for receiving a headstrap to retain the battery case on the headstrap.

5. The apparatus of claim 1, wherein the headstrap light mount includes a pair of slots through which a headstrap can be threaded to secure the light assembly to the headstrap.

6. The apparatus of claim 1, including a micro USB battery charging port.

7. The apparatus of claim 6, wherein the charging port is on the battery case.

8. The apparatus of claim 1, wherein the apparatus, as configured for any of bicycle use, headstrap use or flashlight use, has a total weight of no more than 140 grams.

9. The apparatus of claim 8, with a total weight of no more than 125 grams.

10. The apparatus of claim 1, including a power regulator controlling the lamp element so as to maintain substantially constant light brightness as the battery is drawn down.

11. The apparatus of claim 10, wherein the battery has a recharging time of about five hours.

12. The apparatus of claim 10, wherein the light assembly produces an output beam of at least 150 lumens with a run time of about 3 hours.

13. The apparatus of claim 1, wherein the light assembly produces an output beam of at least 150 lumens with a run time of about 3 hours.

14. The apparatus of claim 1, wherein the battery case includes a plurality of exterior indents, and the clips of each of the bicycle mounting device and the headstrap mounting device have protrusions that are positioned and configured to snap into the indents of the battery case.

15. A portable electric light apparatus defining a kit of parts with multiple uses, comprising:
 a light assembly with a lamp element and a reflector, and a light housing carrying the lamp element and reflector,
 a battery case containing a battery, and an external power cable adapted to connect the battery case and battery to the light assembly,
 the battery case having at one end a receiving adapter for the light assembly, the receiving adapter comprising a slot, and the light assembly including a base, configured to slide closely into the slot and lock therein, so as to join together with the battery case in releasably locking relationship to support the light assembly on said one end of the battery case, enabling use of the light apparatus as a single light projecting unit,
 a bicycle mounting device securable to the battery case, enabling the battery case to be secured to a bicycle or to a helmet,
 a bicycle light mount securable to the light assembly via a, slot on the bicycle light mount similar to the slot on the receiving adapter of the battery case, receiving the base of the light assembly sliding closely therein, and the bicycle light mount being adapted to be secured to a bicycle or a helmet,
 a micro USB charging port for recharging the battery, and
 the light assembly including a power regulator dynamically controlling the lamp element so as to maintain substantially constant light brightness as the battery is drawn down,
 whereby the light apparatus can be configured as a single unit to serve as a flashlight; can be mounted on a helmet with the light housing at front and a battery case at rear, connected together with the power cable; or can be attached to a bicycle handlebar or handlebar stem, connected together with the power cable, all without the use of tools.

16. The apparatus of claim 15, wherein the light assembly includes a pivot joint connecting the base to the light housing, enabling the light housing to be adjusted as to aim.

17. The apparatus of claim 15, wherein the bicycle mounting device includes a clip-on bracket to firmly engage the battery case when assembled thereto, the bracket having means for receiving both ends of the strap.

18. The apparatus of claim 15, wherein the apparatus, as configured for any of bicycle use, helmet use or flashlight use, has a total weight of no more than about 140 grams.

19. The apparatus of claim 15, wherein the light assembly produces an output beam of at least about 150 lumens with a run time of about 3 hours.

20. The apparatus of claim 15, wherein the light assembly has two LED emitters as lamp elements, one projecting white light and one projecting red or green light, the LED emitters being selectively powered, whereby the red or green light LED emitter can be selected for reading in low light conditions, to preserve night vision.

\* \* \* \* \*